United States Patent
Gold et al.

(10) Patent No.: US 7,876,102 B2
(45) Date of Patent: Jan. 25, 2011

(54) MIXED GALVANIC-INDUCTIVE IMAGING IN BOREHOLES

(75) Inventors: Randy Gold, Houston, TX (US); Rashid W. Khokhar, Houston, TX (US); Alexandre N. Bespalov, Spring, TX (US); Leonty A. Tabarovsky, Cypress, TX (US); Gregory B. Itskovich, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 644 days.

(21) Appl. No.: 11/852,900

(22) Filed: Sep. 10, 2007

(65) Prior Publication Data

US 2008/0068024 A1 Mar. 20, 2008

Related U.S. Application Data

(63) Continuation-in-part of application No. 11/521,016, filed on Sep. 14, 2006.

(51) Int. Cl.
*G01V 3/02* (2006.01)
(52) U.S. Cl. .................................. 324/355; 324/367
(58) Field of Classification Search .................. None
See application file for complete search history.

(56) References Cited

U.S. PATENT DOCUMENTS

| | | | |
|---|---|---|---|
| 2,582,314 A * | 1/1952 | Doll ........................... 324/339 |
| 2,736,967 A * | 3/1956 | Doll ........................... 33/544.3 |
| 2,930,969 A | 3/1960 | Baker ........................... 324/10 |
| 3,060,373 A * | 10/1962 | Doll ........................... 324/374 |
| 3,079,550 A * | 2/1963 | Huddleston, Jr. et al. ..... 324/371 |
| 3,388,325 A | 6/1968 | Birdwell et al. |
| 3,959,721 A * | 5/1976 | Roschuk et al. ............. 324/359 |
| 3,973,181 A * | 8/1976 | Calvert ....................... 324/355 |
| 4,468,623 A | 8/1984 | Gianzero et al. ............ 324/367 |
| 4,511,843 A * | 4/1985 | Thoraval .................... 324/338 |
| 5,036,283 A | 7/1991 | Trouiller et al. |
| 5,095,272 A * | 3/1992 | Sinclair ....................... 324/339 |
| 5,235,285 A | 8/1993 | Clark et al. |
| 5,339,037 A * | 8/1994 | Bonner et al. ............... 324/366 |
| 5,359,324 A | 10/1994 | Clark et al. |
| 5,502,686 A | 3/1996 | Dory et al. ..................... 367/34 |
| 6,714,014 B2 | 3/2004 | Evans et al. ................. 324/374 |
| 7,042,225 B2 * | 5/2006 | Barber ........................ 324/338 |
| 2002/0108784 A1 | 8/2002 | Kruspe et al. |
| 2006/0173624 A1 | 8/2006 | Frenkel |

FOREIGN PATENT DOCUMENTS

CA 685727 5/1960

* cited by examiner

*Primary Examiner*—Jay M Patidar
(74) *Attorney, Agent, or Firm*—Mossman Kumar & Tyler PC

(57) ABSTRACT

A mixed mode tool uses an inductive source and detects galvanic currents and/or potentials at electrodes in proximity to a borehole wall to produce a resistivity image of the earth formation. Alternative, the magnetic field produced by a galvanic current is detected by an antenna coil and used to produce a resistivity image.

20 Claims, 11 Drawing Sheets

US 7,876,102 B2

MIXED GALVANIC-INDUCTIVE IMAGING IN BOREHOLES

CROSS-REFERENCES TO RELATED APPLICATIONS

This application is a continuation-in-part of U.S. patent application Ser. No. 11/521,016 filed on 14 Sep. 2006.

BACKGROUND OF THE DISCLOSURE

1. Field of the Disclosure

This disclosure generally relates to exploration for hydrocarbons involving electrical investigations of a borehole penetrating an earth formation. More specifically, this disclosure relates to highly localized borehole investigations employing the introduction and measuring of individual survey currents injected into the wall of a borehole 2. Background of the Art Electrical earth borehole logging is well known and various devices and various techniques have been described for this purpose. Broadly speaking, there are two categories of devices used in electrical logging devices. In the first category, a measure electrode (current source or sink) are used in conjunction with a diffuse return electrode (such as the tool body). A measure current flows in a circuit that connects a current source to the measure electrode, through the earth formation to the return electrode and back to the current source in the tool. In inductive measuring tools, an antenna within the measuring instrument induces a current flow within the earth formation. The magnitude of the induced current is detected using either the same antenna or a separate receiver antenna. The present disclosure is a hybrid of the two.

There are several modes of operation of prior art devices: in one, the current at the measuring electrode is maintained constant and a voltage is measured while in the second mode, the voltage of the electrode is fixed and the current flowing from the electrode is measured. Ideally, it is desirable that if the current is varied to maintain constant the voltage measured at a monitor electrode, the current is inversely proportional to the resistivity of the earth formation being investigated. Conversely, it is desirable that if this current is maintained constant, the voltage measured at a monitor electrode is proportional to the resistivity of the earth formation being investigated. Ohm's law teaches that if both current and voltage vary, the resistivity of the earth formation is proportional to the ratio of the voltage to the current.

Techniques for investigating the earth formation with arrays of measuring electrodes have been proposed. See, for example, the U.S. Pat. No. 2,930,969 to Baker, Canadian Patent No. 685727 to Mann et al., U.S. Pat. No. 4,468,623 to Gianzero, and U.S. Pat. No. 5,502,686 to Dory et al. and U.S. Pat. No. 6,714,014 to Evans et al, each of which provide additional background information to this disclosure.

In the prior art devices, current is actively focused in the direction perpendicular to the borehole wall. There is a technical challenge to provide stable focusing conditions during the logging if the borehole walls are rough or the mud is very conductive. As soon as the focusing conditions are not met, the measurements are responsive to a considerable extent to the properties of the mud. The prior art devices do not specifically address the problems due to irregularities in the wall surface of the wellbore. If the wall of the wellbore is irregular, the measuring current path becomes distorted and the relationship between measured impedance and earth formation resistivity changed as result.

SUMMARY OF THE DISCLOSURE

One embodiment of the disclosure is an apparatus for evaluating an earth formation. The apparatus includes at least two electrodes configured to convey a current into the formation and at least one antenna configured to be conveyed into a borehole and providing a signal responsive to the current, the at least one antenna being in proximity to formation and the signal being indicative of a resistivity property of the formation. The at least one antenna may be mounted on a pad extendable from a body of the logging tool. The at least two electrodes may be positioned on a mandrel of the logging tool. The at least two electrodes may be positioned on a pad extendable from a body of the logging tool. The two electrodes are configured to provide a current in a direction that is substantially parallel to a longitudinal axis of the logging tool or substantially orthogonal to a longitudinal axis of the logging tool. The apparatus may further include a processor configured to provide an image of the resistivity property of the earth formation. The apparatus may include an additional pad extendable from the boarding of the logging tool, the additional pad including at least one additional antenna. The at least one antenna is configured to be carried on a downhole assembly, the downhole assembly being selected from a bottomhole assembly and a logging string. The apparatus may further include a conveyance device configured to convey the at least one antenna into the borehole, the conveyance device being a wireline, a drilling tubular or a slickline.

Another embodiment of the disclosure is a method of evaluating an earth formation. The method includes conveying a current into the formation using two electrodes, and using at least one antenna conveyed in a borehole for providing a signal responsive to current, the at least one antenna being in proximity to the formation, and the signal being indicative of a resistivity property of the earth formation. The method may further include disposing the at least one antenna on a pad extendable from a body of a logging tool. The method may further include disposing the at least two electrodes on a mandrel of a logging tool. The method may further include disposing the at least two electrodes on a pad extendable from a body of a logging tool. The method may further include flowing the current in a direction that is substantially parallel to a longitudinal axis of the logging tool or substantially orthogonal to a longitudinal axis of the logging tool. The method may further include providing an image of the resistivity property of the earth formation. The determined resistivity property may be used for reservoir navigation, reservoir evaluation and/or reservoir development. The antenna may be conveyed on a bottomhole assembly or on a logging string. The antenna may be conveyed into the borehole using a wireline, a drilling tubular, or a slickline.

Another embodiment of the disclosure is a computer readable medium for use with an apparatus for evaluating an earth formation. The apparatus includes at least two electrodes configured to convey a current into the formation, and at least one antenna configured to be conveyed in a borehole and provide a signal responsive to the current, the at least one antenna being in proximity to the formation and the signal being indicative of a resistivity property of the formation. The medium includes instructions which enable a processor to use the signal to produce an image of the resistivity property of the earth formation. The medium may include a RAM, a ROM, an EPROM, an EAROM, a flash memory, and/or an optical disk.

BRIEF DESCRIPTION OF THE FIGURES

The present disclosure is best understood with reference to the accompanying figures in which like numerals refer to like elements and in which.

DETAILED DESCRIPTION OF THE DISCLOSURE

Figure 1:
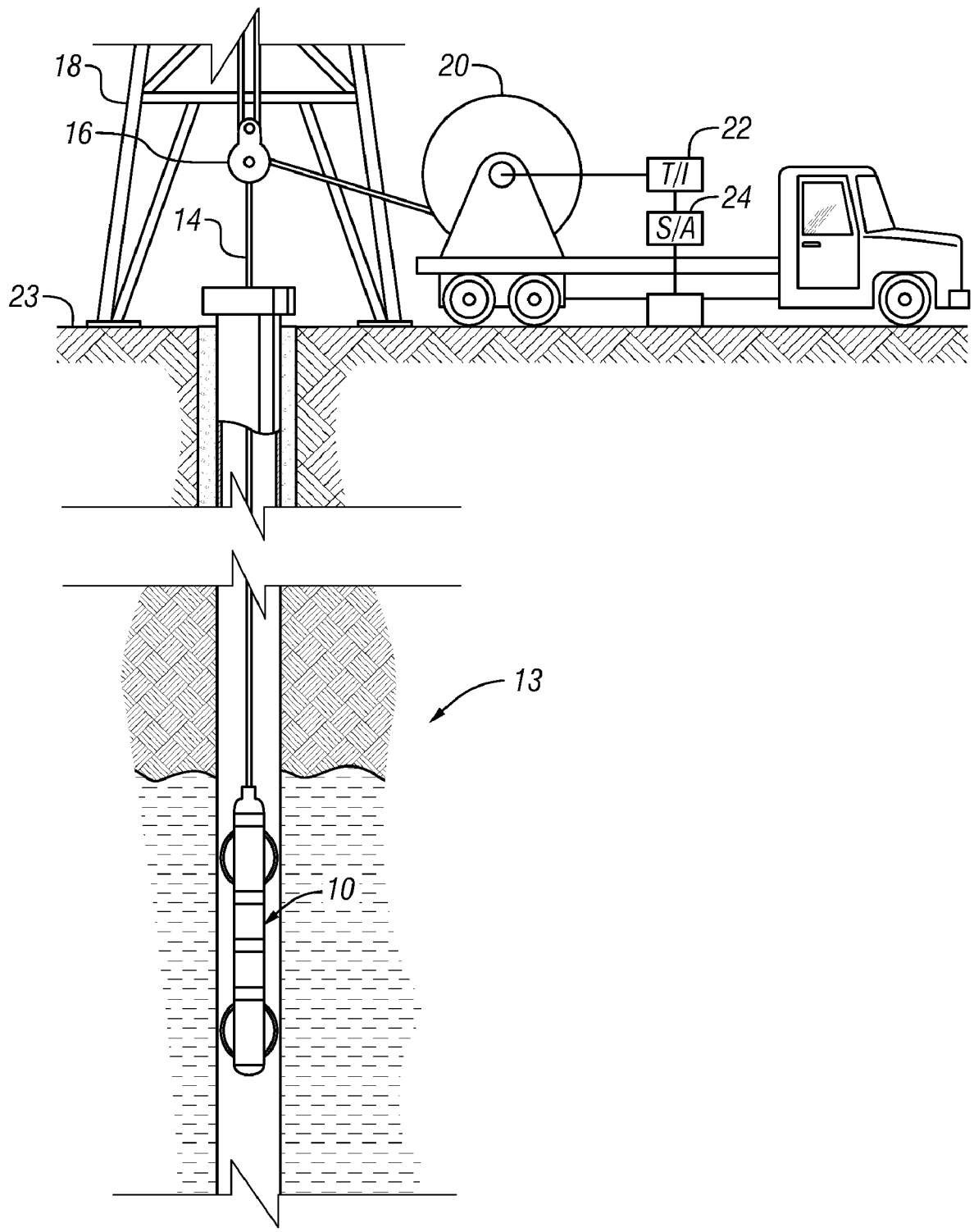
FIG. 1 shows an exemplary logging tool suspended in a borehole.

FIG. 1 shows an imaging tool 10 suspended in a borehole 12, that penetrates earth formations such as 13, from a suitable cable 14 that passes over a sheave 16 mounted on drilling rig 18. The cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data.

Figure 2:
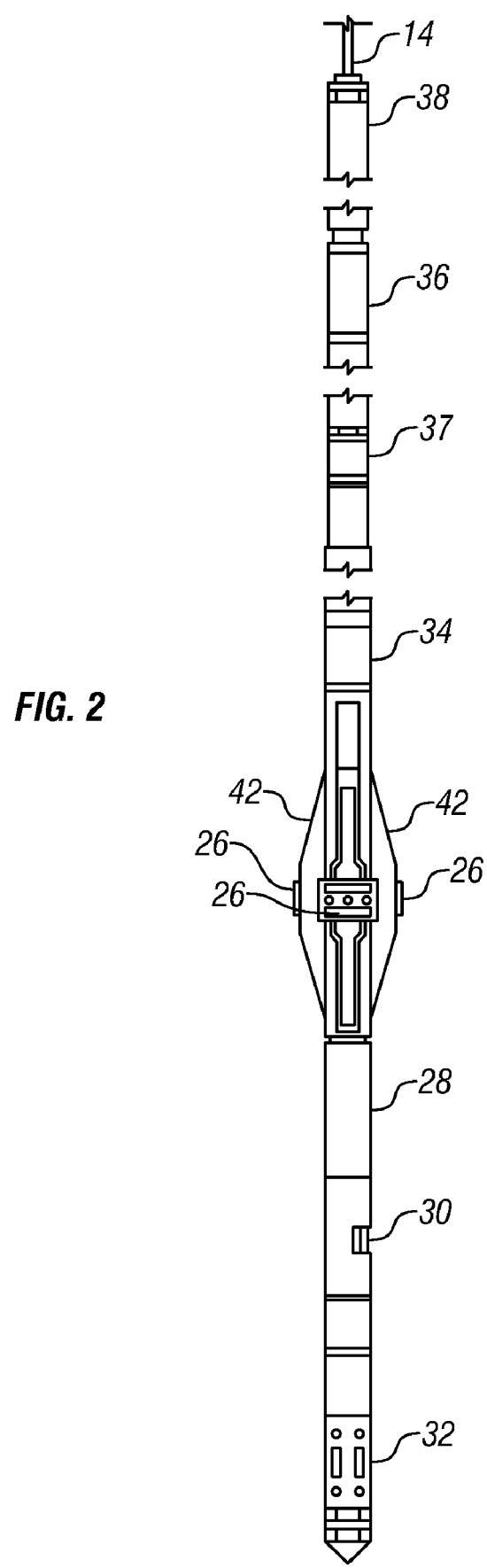
FIG. 2 is a mechanical schematic view of an exemplary imaging tool.

FIG. 2A is a schematic external view of a borehole sidewall imager system. The tool 10 comprising the imager system includes resistivity arrays 26. Optionally, the imager system may include other sensors, such as a mud cell 30 or a circumferential acoustic televiewer 32. Electronics modules 28 and 38 may be located at suitable locations in the system and not necessarily in the locations indicated. The components may be mounted on a mandrel 34 in a conventional well-known manner. The outer diameter of the assembly may be about 5 inches and about fifteen feet long. An orientation module 36 including a magnetometer and an accelerometer or inertial guidance system may be mounted above the imaging assemblies 26 and 32. The upper portion 38 of the tool 10 contains a telemetry module for sampling, digitizing and transmission of the data samples from the various components uphole to surface electronics 22 in a conventional manner. If acoustic data are acquired, they are preferably digitized, although in an alternate arrangement, the data may be retained in analog form for transmission to the surface where it is later digitized by surface electronics 22. Also shown in FIG. 2A are three resistivity arrays 26 (a fourth array is hidden in this view.

Figure 3A:
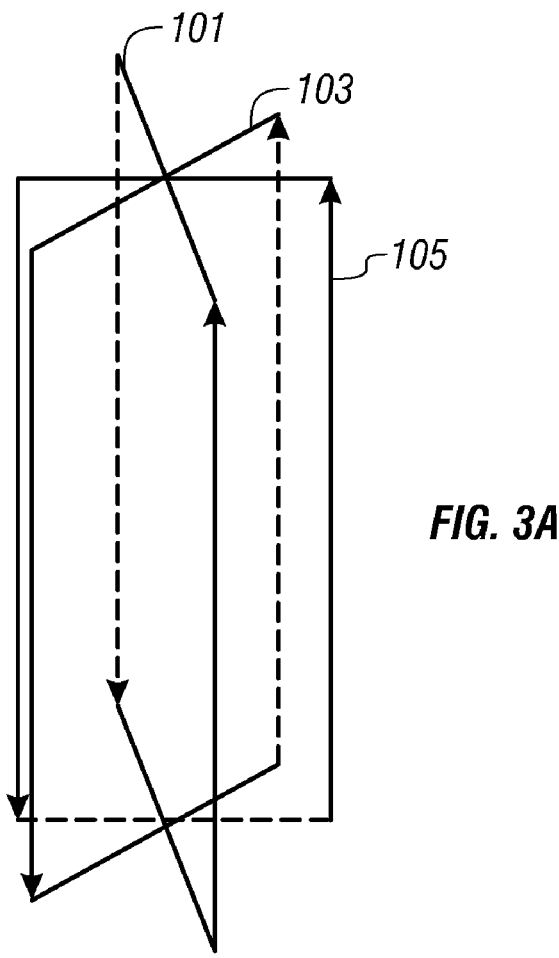
FIG. 3a is a schematic illustration of three coils on a tool of the present disclosure.
Figure 3C:
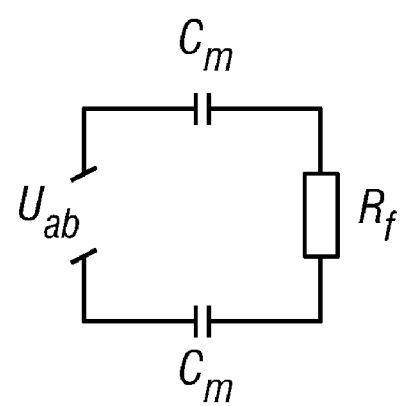
FIG. 3c is an equivalent circuit diagram of a resistivity imaging tool.
Figure 3B:
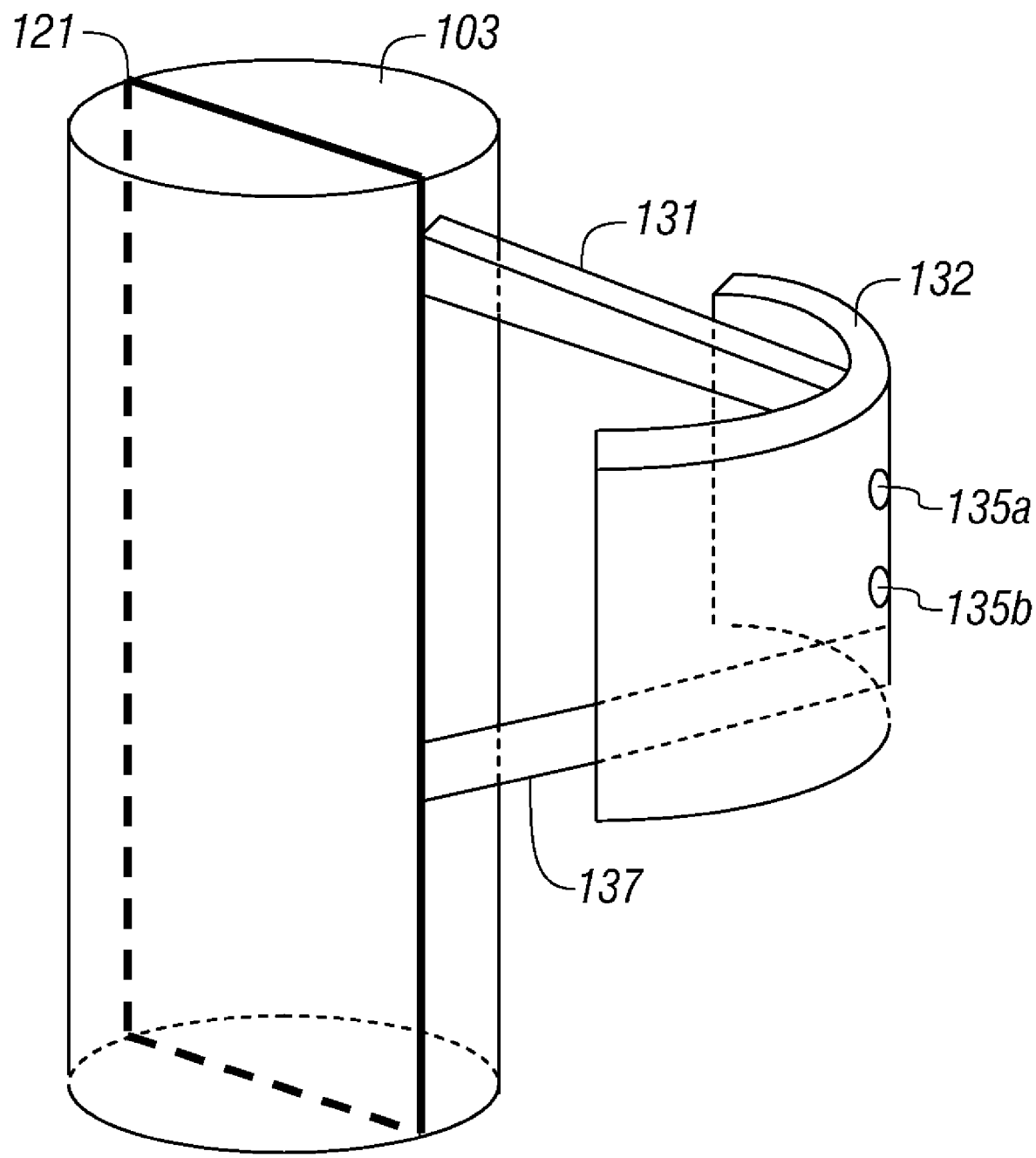
FIG. 3b illustrates an embodiment of the present disclosure showing a single coil on a mandrel and pad mounted electrodes.

Turning to FIG. 3A, a simplified exemplary diagram of three vertical coils 101, 103, 105 of the present invention on a mandrel (not shown) of the present invention is shown. FIG. 3B show one of the coils 103 mounted inside or on the surface of mandrel 121. Arms depicted schematically by 131, 137 extend a pad 133 radially outward from the mandrel to make contact with the borehole wall (not shown). Disposed on the pad 133 are electrodes depicted schematically by 135a, 135b. Another pad (not shown) may be positioned on the opposite side of the coil 103 from the pad 133. In an alternate embodiment of the invention, a single coil may be mounted on the mandrel with its axis along the tool axis.

This tool may be referred to as a "mixed mode" tool in that an inductive source is used and galvanic currents are detected by the electrodes. Specifically, a plurality of long transversal rectangular coils with the magnetic moment perpendicular to the axis of the borehole are used. Each transmitter loop is centered in the borehole and electrode pairs are placed on the pad attached to the borehole wall. This is a generic design and further variants are identified below. In a practical design each transmitted coil serves two pads with a number of electrode pairs on each pad. Each transmitter coil may have its own operating frequency to avoid the interference of the neighboring induction coils. By using an induction transmitter, an electric current can be injected into the formation.

At a low frequency and relatively close to the induction loop, the electric field does not depend on the conductivity of the formation and can be increased simply by increasing the operating frequency ω. In the case of a galvanic injection and non-conductive mud the injection current must go through quite a large capacitive résistance. This can be better understood from the simplified schematics in FIG. 3C where the capacitor $C_m$ represents the capacitance between the injection electrodes and the formation, and $R_f$ corresponds to the resistivity of the formation. The current $I_f$ injected into the formation can then be expressed as $$I_f = \frac{U_{ab}}{2X_c + R_f}, X_c = \frac{1}{i\omega C_m}, C_m \approx \varepsilon \frac{S}{d}, \quad (2)$$

where S is the area of the electrode, $U_{ab}$ is the applied potential difference between the injection electrodes a and b. Because $C_m$ is inversely proportional to the distance d between the current electrode and the formation, the amount of the current injected into the formation will drop with increasing standoff. A long induction transmitter is free of such high sensitivity to the standoff value and well suited to the nonconductive environment.

If only electric field is measured, the measurements will be very sensitive to a relative variation of resistivity in the adjacent formation. To derive the absolute resistivity of the formation, some additional induction measurements and their combination with the galvanic readings are helpful.

Figure 4:
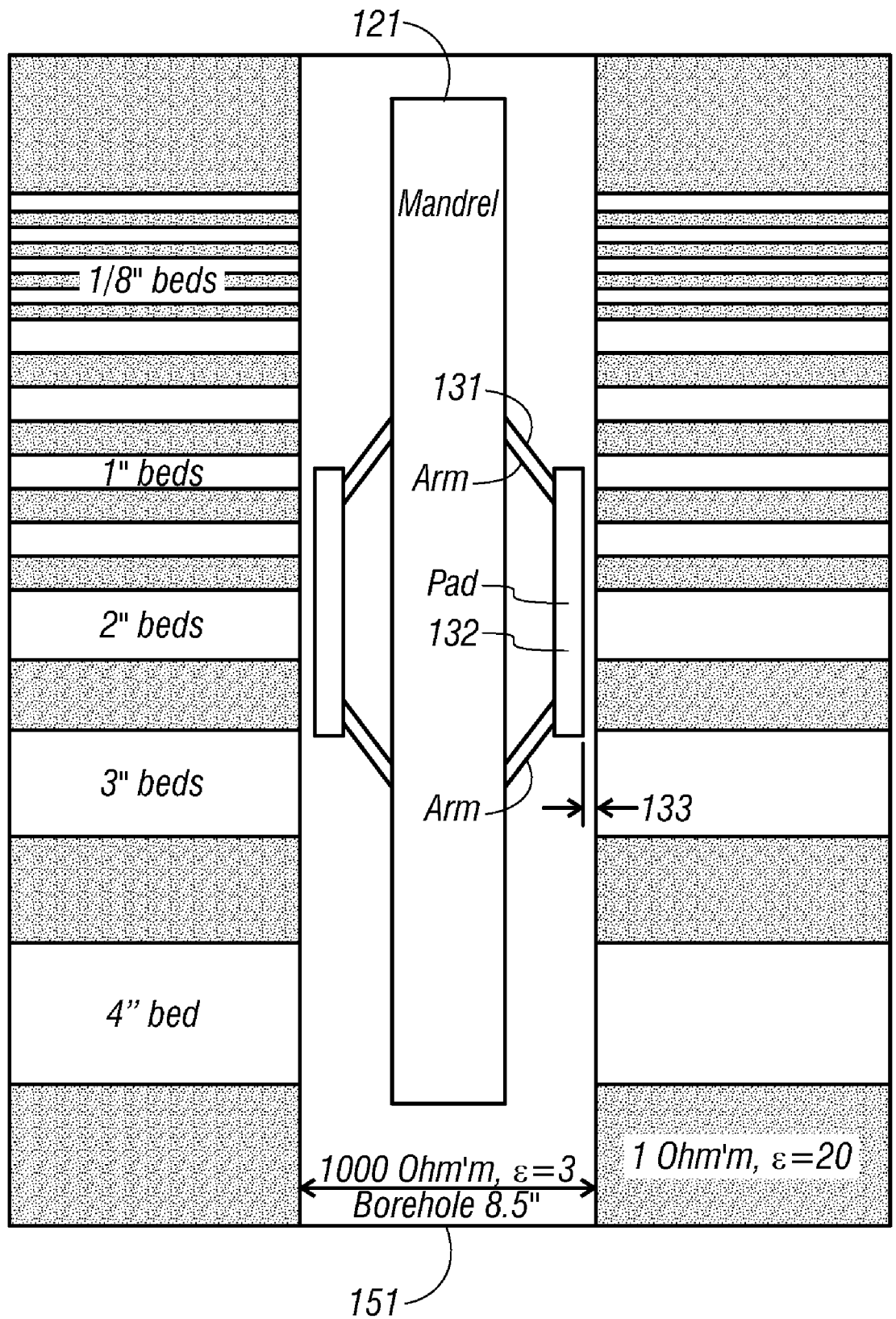
FIGS. 4 and 5 show exemplary models used for evaluation of the tool configuration of FIG. 3b.

The response of the tool design of FIG. 3B was tested on a number of different models. One of these is illustrated in FIG. 4. Shown therein is a borehole 151 with a diameter of 8.5 inches (21.6 cm). The mandrel is shown as 121, a pad by 132 and an arm on which the pad is carried by 131. The tool has a variable standoff 133. The formation comprises beds of thickness 0.5 inches, 1 inch, 2 inches, 3 inches and 4 inches (1.27 cm, 2.54 cm, 5.08 cm, 7.62 cm and 10.16 cm respectively). The layers had resistivities ρ and relative dielectric constant ∈ of (10 Ω-m, 10) and (1 Ω-m, 20) respectively.

Figure 5:
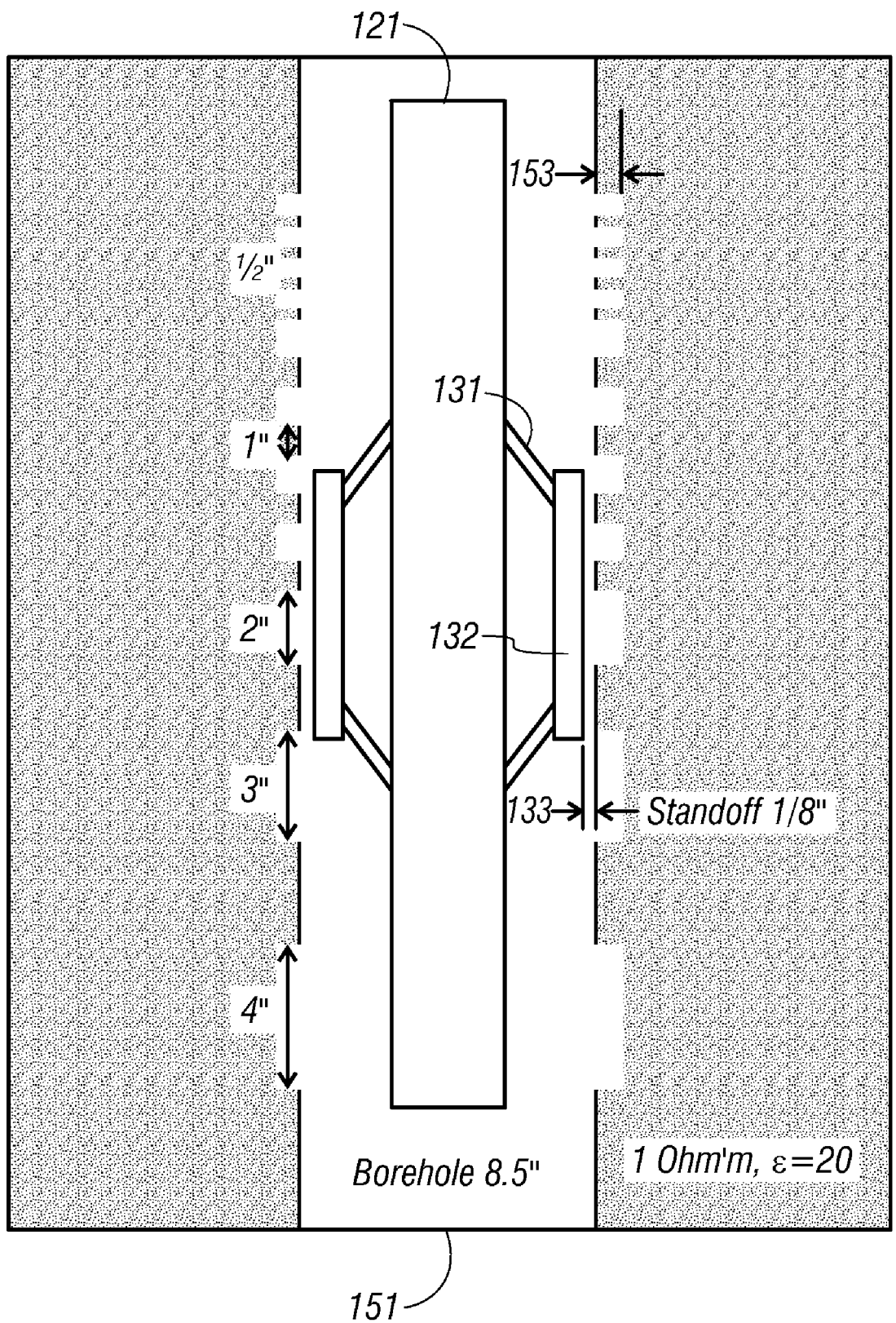

In a second model shown in FIG. 5, the formation had a uniform ρ=1 Ω-m, ∈=20, The standoff was fixed at ⅛ inches (3.18 mm). However, the borehole was rugose, with a depth of rugosity varied between ¼ inches and ¾ inches (6.35 mm and 19.1 mm). Response to other models which represented a combination of the features of the models of FIGS. 4 and 5 were also simulated.

In the modeling, a 0.914-m long transmitter with a width of 0.1524 m was used. The operating frequency was 100 kHz. In the case of lower or higher frequencies (up to several MHz), the response can be approximately derived simply by linear resealing of the signal corresponding to 100 kHz frequency. A transmitter loop is placed in the nonconductive borehole environment with the radius of the borehole 10.795 cm. An electrode spacing of 0.25 inches or 0.5 inches (0.63 cm and 1.27 cm) was used to measure a potential drop $U_z$ in the vertical direction parallel to the borehole axis.

Figure 6:
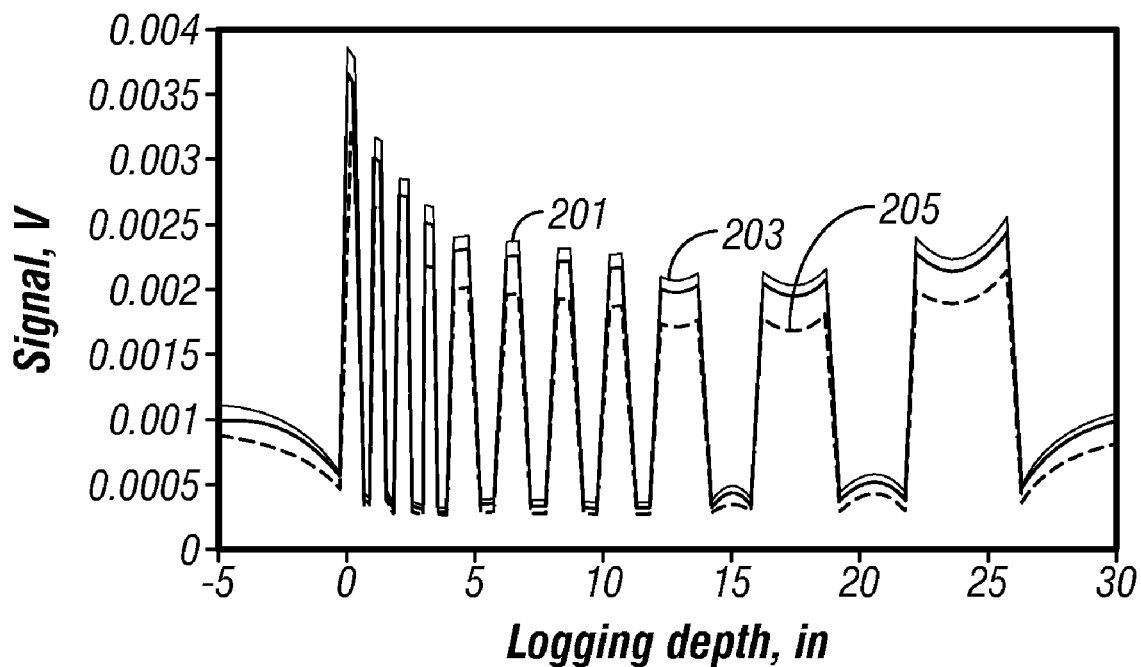
FIG. 6 shows the response at different azimuths for the model of FIG. 4 with no rugosity.
Figure 7:
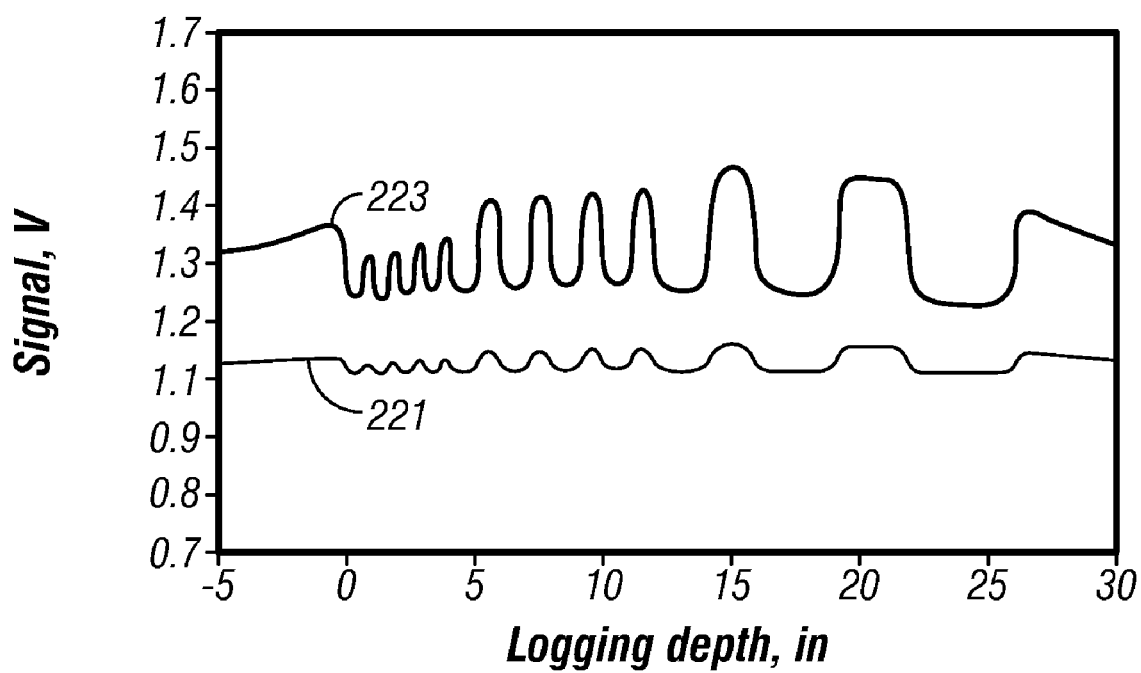
FIG. 7 shows the K-factor for the curves of FIG. 6 for azimuths of 10° and 20°.
Figure 8:
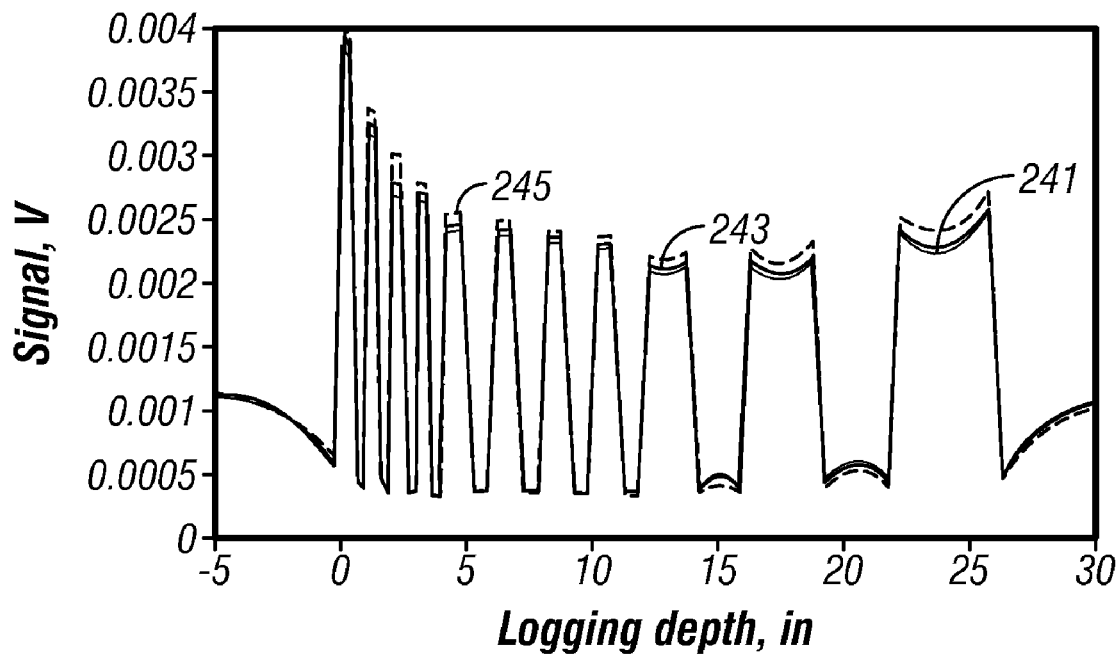
FIG. 8 shows the results of applying the K-factor to the 10° and 20° azimuth curves.

The typical behavior of the electrical signal to the model is presented in FIG. 6. The three curves 201, 203 and 205 in this figure correspond to azimuths of 0°, 10° and 20° of the receiver's electrode pairs. The abscissa in the figure is the logging depth in inches and the ordinate is the signal (the voltage difference between the button electrodes). The 10° and 20° deg. azimuth curves can be shifted to the 0° deg. curve by applying a K-factor that is about 1.07 for the 10° curve and 1.27 for the 20-degree curve. The division result of 10° and 20° curves by the 0°. curve is presented in FIG. 7 as the curves 221 and 223, while the result of K-factor application to the original curves from FIG. 7 is presented in FIG. 8. 241 is the original 0° azimuth response to the model from FIG. 7. 243 is the corrected 10° azimuth response to the model while 245 is the corrected 20° azimuth response. From FIG. 8 it can be seen that it is possible to cover an azimuth range of 40° (from −20° to +20°) by having additional columns of electrodes on the pad of FIG. 3B.

The dynamic range, which is the ratio between the maximum and minimum reading along the logging depth, is changing between 5 and 6 considering layers 1 in. and larger. We define a Normalized Dynamic Range (NDR) as a ratio of a signal dynamic range to a resistivity contrast of the corresponding media. In the model of FIG. 5 the resistivity contrast of the neighboring layers is 10, so that the NDR of the mixed mode arrangement is approximately 0.55.

Figure 9:
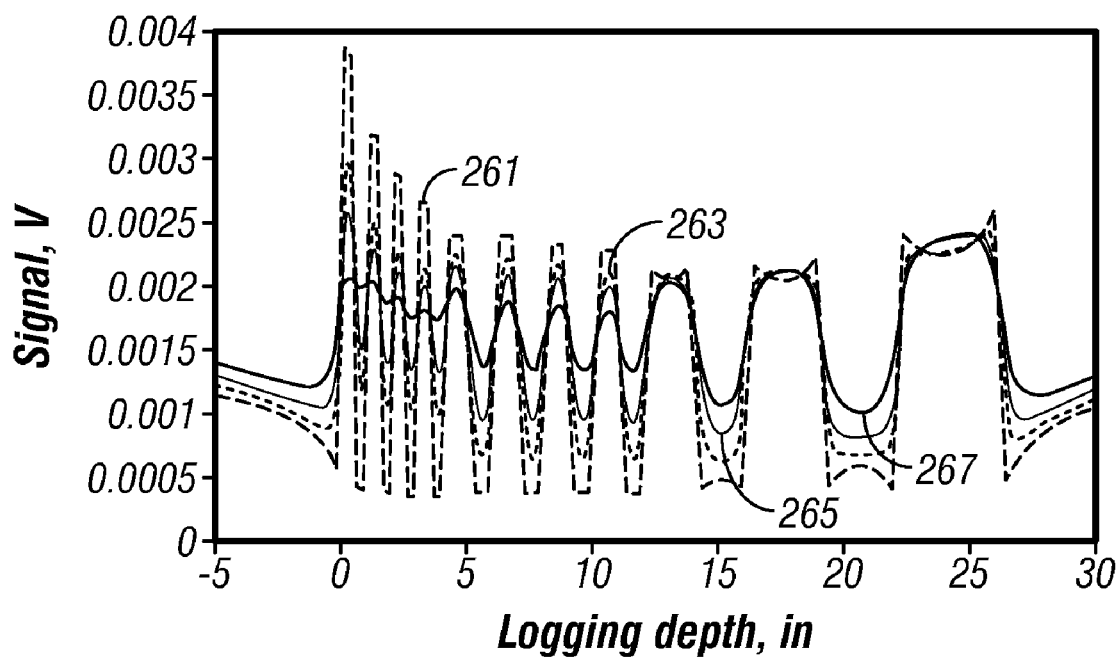
FIG. 9 shows the response at different standoffs for the model of FIG. 4.

Next, examples showing the influence of the distance between the receiver electrodes and the borehole wall are presented. The results of mathematical modeling for the same benchmark model of FIG. 5 are presented in FIG. 9. The electrode spacing is 0.25 inches (6.35 mm). For the ⅛ inch (3.18 mm) standoff 263 the NDR drops to 0.3 in the 1 inch (2.54 cm) thick layer and decreases to 0.2 and 0.13 for the ¼ in (6.3 mm) 265 and ½ in (1.27 cm) 267 standoff, correspondingly. For the 2 in (5.08 cm) layer thickness the NDR parameter is as much as twice larger than for 1 in (2.54 cm) layers. The imperfections due to standoff are more noticeable in the conductive layers, and there is no signal imperfection in the resistive layers thicker than 2 in (5.08 cm).

Figure 10:
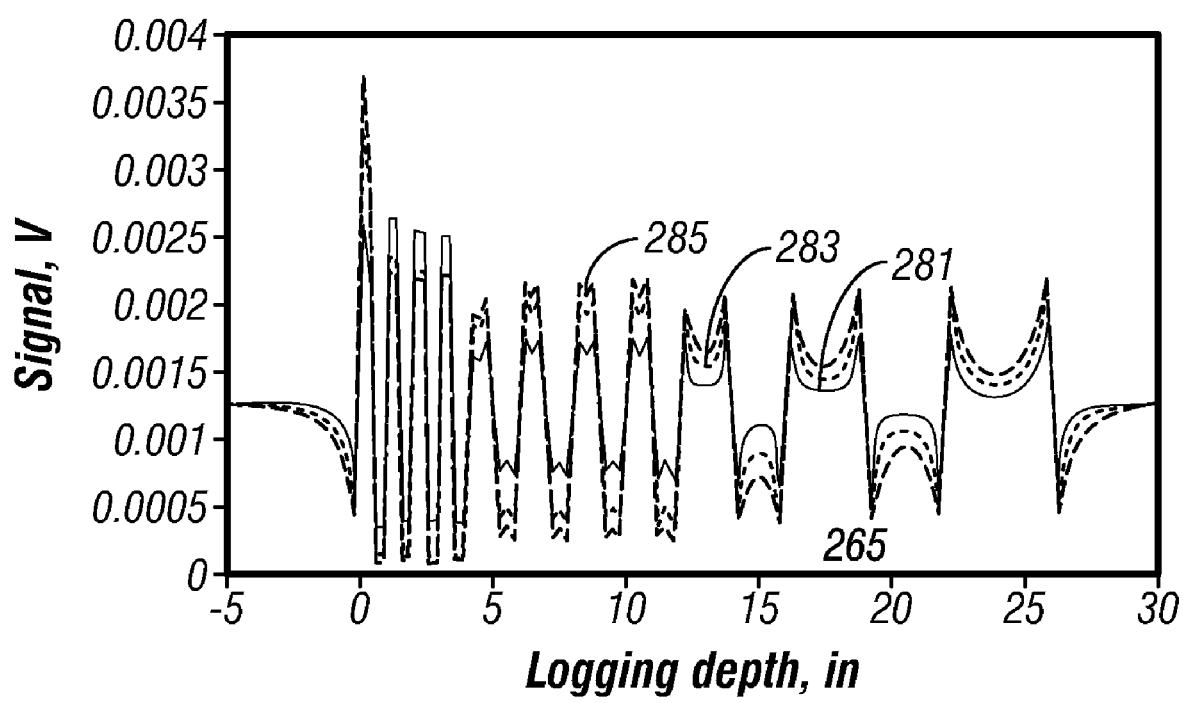
FIG. 10 shows the effect of rugosity on measurements made by an exemplary tool. of the present disclosure.

Turning next to FIG. 10, the sensitivity of the measured electric field for the model of FIG. 6 as a function of borehole rugosity is shown. The curves 281, 283 and 285 correspond to rugosity of ¼ inch (6.3 mm), ½ inc (1.27 cm) and ¾ inches (1.91 cm) respectively. This is a model with no resistivity contrasts, but the signal from the rugose wall has all the features of a structure-boundaries and resistivity contrast. Of course, these artifacts are more pronounced for the ½ inc (1.27 cm) and ¾ inches (1.91 cm) rugosity than for the ¼ inch (6.3 mm) rugosity. Based on extensive modeling results (not shown), we have concluded that in the case of a 0.25-in. rugosity depth, all 1-in. beds are well resolved (NDR>0.2) and the presence of the rugosity in some beds does not destroy the readings in front of neighboring beds. The situation deteriorates as the rugosity is increased to 0.5 in. and 0.75 in.

The embodiments of the disclosure discussed above used button electrodes for measuring a voltage difference resulting from currents induced in the formation by an antenna. Other embodiments of the disclosure use the principle of reciprocity to modify the designs discussed above. In these other embodiments, a current is conveyed into the formation using an electrode and an inductive sensor is used to measure the magnetic field in the formation due to the current flow. This magnetic field is related to the formation conductivity.

Figure 11A:
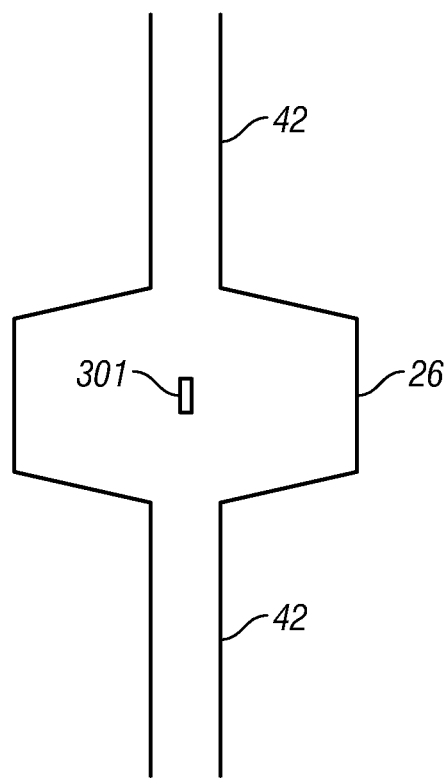
FIG. 11a shows an embodiment of the disclosure using an inductive sensor on a pad.
Figure 11B:
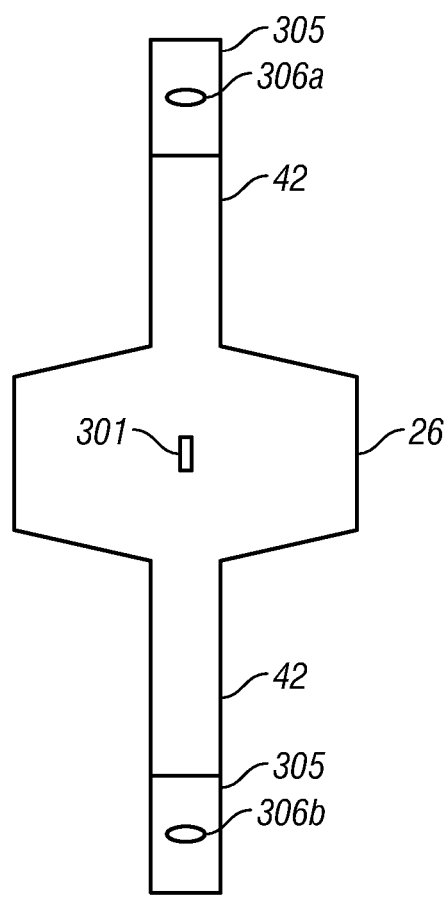
FIG. 11b shows an embodiment of the disclosure with two electrodes on a mandrel.

An example is shown in FIG. 11a. Shown therein is a pad depicted by 26. The bowsprings are depicted by 42. Current is conveyed into the formation using electrodes (not shown) at a suitable point on the mandrel. As would be known to those versed in the art, these electrodes should be large enough so that the result of variations in standoff at the electrodes art averaged out. With an electrode above and an electrode below the pad 26, current flow in the formation is substantially vertical. Such a vertical current flow will produce a magnetic field that depends upon the formation conductivity. At least one antenna (coil) such as 301 with a transverse axis can be used to measure the magnetic field. FIG. 11b shows an embodiment in which the two electrodes 306a, 306b are on a mandrel 305 on opposite sides. Antennas may be provided on two or more padsas shown in FIG. 2.

Figure 12:
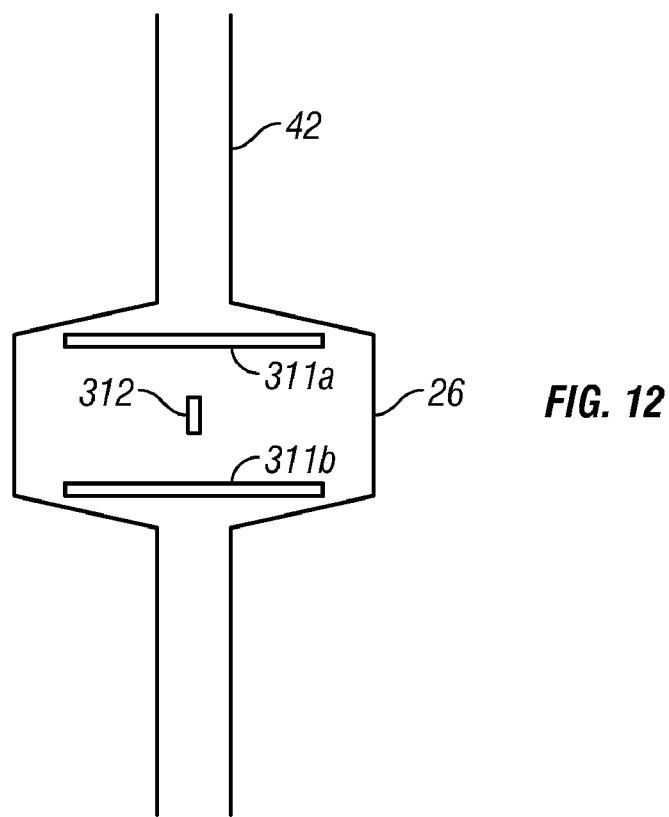
FIG. 12 shows an embodiment of the disclosure using an inductive sensor and a current source on a pad.

Another embodiment is shown in FIG. 12. Shown therein is a pad depicted by 26. The bowsprings are depicted by 42. Current is conveyed into the formation using electrodes 311a, 311b on the pad. These electrodes provide a vertical current flow in the formation. The magnectic field produced by the current is a funtion of the formation conductivity. At least one antenna (coil) such a 312 with a transverse axis can be used to measure the magnetic field.

Figure 13:
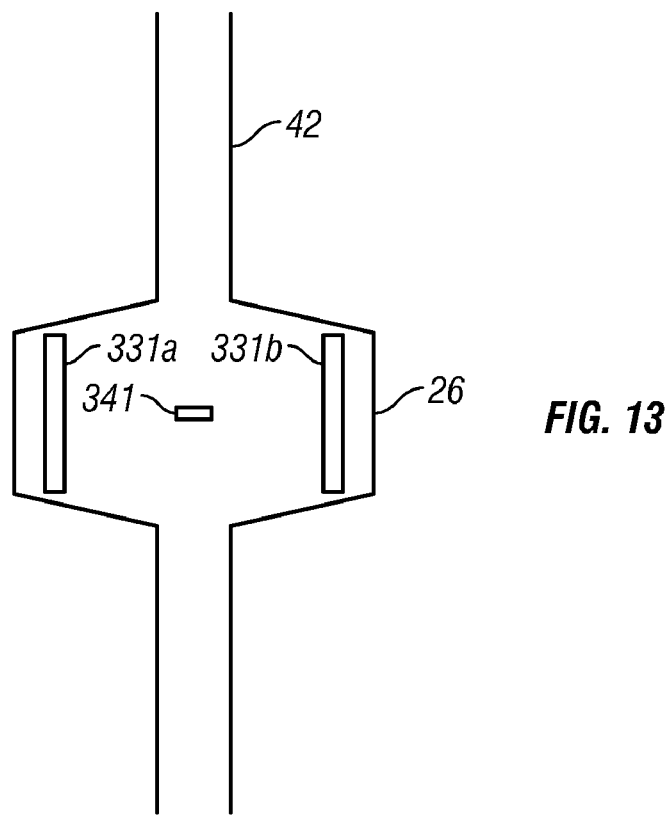
FIG. 13 shows an embodiment of the disclosure having azimuthal sensitivity using an inductive sensor and a current source on a pad.

Yet another embodiment is shown in FIG. 13. Electrodes 331a, 331b are used to convey a current in the horizontal direction in the formation. A coil antenna 341 with a vertical axis is used to provide a signal indicative of formation conductivity.

It should be noted that in the embodiments discussed in FIGS. 11-13, more than one coil may be used to provide measurements for a resistivity image. It should further be noted that for MWD applications, it may not be necessary to use the array measurements since the rotation of the tool and the forward motion of the drill bit can be used to make measurements for a resistivity image using a single coil antenna.

It should further be noted that if the medium is anisotropic, the configuration of FIGS. 11-12 will measure of the vertical resistivity while the configuration of FIG. 13 will measure the horizontal resistivity of the formation.

The processed resistivity measurements may be recorded on a suitable medium. In addition, the resistivity measurements may be used in reservoir evaluation. Resistivity images made with wireline instruments are useful in determining formation dips, reservoir boundaries and fault directions. All of these provide useful insight in establishing recoverable reserves and productivity of reservoirs. This includes determination of completion operations, setting of casing, fracturing operations and the like. In addition, measurements made in an MWD setting a useful in reservoir navigation wherein the directional drilling may be controlled based upon a resistivity image.

The processing of the data may be done with the use of a computer program implemented on a suitable machine readable medium that enables the processor to perform the control and processing. The term processor as used in this application is used in its traditionally-broad sense and is intended to include such devices as single-core computers, multiple-core computers, distributed computing systems, field programmable gate arrays (FPGAs) and the like. The machine readable medium referenced in this disclosure is any medium that may be read by a machine and may include magnetic media, RAM, ROM, EPROM, EAROM, flash memory and optical disks. The processing may be done downhole or at the surface. In an alternative embodiment, part of the processing may be done downhole with the remainder conducted at the surface.

The disclosure has been described with reference to a wireline conveyed logging tool. The principles discussed above may also be used in a measurement-while-drilling (MWD) implementation in which the logging tool is part of a bottomhole assembly (BHA) conveyed on a drilling tubular. The method may also be used with the logging tool conveyed on a slickline. For the purposes of the present disclosure, the term "downhole assembly" may be used to describe a BHA as well as configurations in which the logging tool is part of an assembly conveyed on a wireline or slickline.

The following definitions are helpful in understanding the present disclosure.

coil: one or more turns, possibly circular or cylindrical, of a current-carrying conductor capable of producing a magnetic field;

EAROM: electrically alterable ROM;

EPROM: erasable programmable ROM;

flash memory: a nonvolatile memory that is rewritable;

induction: based on a relationship between a changing magnetic field and the electric field created by the change;

machine readable medium: something on which information may be stored in a form that can be understood by a computer or a processor;

mandrel: A bar, shaft or spindle around which other components are arranged or assembled. The term has been extended in oil and gas well terminology to include specialized tubular components that are key parts of an assembly or system;

misalignment: the condition of being out of line or improperly adjusted;

Optical disk: a disc shaped medium in which optical methods are used for storing and retrieving information;

Position: an act of placing or arranging; the point or area occupied by a physical object ROM: Read-only memory;

Resistivity: electrical resistance of a conductor of unit cross-sectional area and unit length. Determination of resistivity is equivalent to determination of its inverse (conductivity);

Rugosity: A qualitative description of the roughness of a borehole wall. Alternatively, the term pertains to a borehole whose diameter changes rapidly with depth.

While the foregoing disclosure is directed to the preferred embodiments of the disclosure, various modifications will be apparent to those skilled in the art. It is intended that all variations within the scope and spirit of the appended claims be embraced by the foregoing disclosure.

What is claimed is:

1. An apparatus for evaluating an earth formation, the apparatus comprising:
    at least two electrodes configured to convey a current into the formation; and
    at least one antenna configured to be conveyed in a borehole and provide a signal responsive to the current, the at least one antenna being in proximity to the formation, the signal being indicative of a resistivity property of the earth formation;
    wherein the at least one antenna is positioned between a first one of the at least two electrodes and a second one of the at least two electrodes.

2. The apparatus of claim 1 wherein the at least one antenna is mounted on a pad extendable from a body of a logging tool.

3. The apparatus of claim 1 wherein the at least two electrodes are positioned on a mandrel of a logging tool.

4. The apparatus of claim 1 wherein the at least two electrodes are positioned on a pad extendable from a body of a logging tool.

5. The apparatus of claim 4 wherein the at least two electrodes are configured to provide a current flow in a direction that is one of: (i) substantially parallel to a longitudinal axis of the logging tool, and (ii) substantially orthogonal to a longitudinal axis of the logging tool.

6. The apparatus of claim 1 further comprising a processor configured to provide an image of the resistivity property of the earth formation.

7. The apparatus of claim 2 further comprising an additional pad extendable from the body of the logging tool, the additional pad including at least one additional antenna.

8. The apparatus of claim 1 wherein the at least one antenna is configured to be carried on a downhole assembly, a downhole assembly being selected from (i) a bottomhole assembly, and (ii) a logging string.

9. The apparatus of claim 1 further comprising a conveyance device configured to convey the at least one antenna into the borehole, the conveyance device selected from: (i) a wireline, (ii) a drilling tubular, and (iii) a slickline.

10. A method of evaluating an earth formation, the method comprising:
    conveying a current into the formation using at least two electrodes; and
    using at least one antenna positioned between a first one of the at least two electrodes and a second one of the at least two electrodes for providing a signal responsive to the current, the at least one antenna being in proximity to the formation, the signal being indicative of a resistivity property of the earth formation.

11. The method of claim 10 further comprising disposing the at least one antenna on a pad extendable from a body of a logging tool.

12. The method of claim 10 further comprising disposing the at least two electrodes on a mandrel of a logging tool.

13. The method of claim 10 further comprising disposing the at least two electrodes on a pad extendable from a body of a logging tool.

14. The method of claim 13 further comprising flowing the current in a direction that is one of: (i) substantially parallel to a longitudinal axis of the logging tool, and (ii) substantially orthogonal to a longitudinal axis of the logging tool.

15. The method of claim 10 further comprising providing an image of the resistivity property of the earth formation.

16. The method of claim 10 further comprising using the determined resistivity property for at least one of: (i) reservoir navigation, (ii) reservoir evaluation, and (iii) reservoir development.

17. The method of claim 10 further comprising conveying the at least one antenna on a device selected from selected from (i) a bottomhole assembly, and (ii) a logging string.

18. The method of claim 10 further comprising conveying the at least one antenna into the borehole using a conveyance device selected from: (i) a wireline, (ii) a drilling tubular, and (iii) a slickline.

19. A computer readable medium product having stored thereon instructions that when read by a processor cause the processor to execute a method, the method comprising: for use with an apparatus for evaluating an earth formation, the apparatus comprising:
using a signal from an antenna positioned between a first electrode and a second electrode responsive to a current flow in an earth formation conveyed by the first electrode and the second electrode for producing an image of a resistivity property of the earth formation.

20. The medium of claim 19 further comprising at least one of (i) a RAM, (ii) a ROM, (iii) an EPROM, (iv) an EAROM, (v) a flash memory, and (vi) an optical disk.

* * * * *